Feb. 14, 1967   P. F. SCHUTT   3,304,232
METHOD OF OPERATING A PULSED NUCLEAR REACTOR
Filed Sept. 12, 1963

INVENTOR.
Paul F. Schutt
BY
ATTORNEY

Feb. 14, 1967 P. F. SCHUTT 3,304,232
METHOD OF OPERATING A PULSED NUCLEAR REACTOR
Filed Sept. 12, 1963 2 Sheets-Sheet 2

United States Patent Office 3,304,232
Patented Feb. 14, 1967

---

3,304,232
METHOD OF OPERATING A PULSED NUCLEAR REACTOR
Paul F. Schutt, Lynchburg, Va., assignor to The Babcock & Wilcox Company, New York, N.Y., a corporation of New Jersey
Filed Sept. 12, 1963, Ser. No. 308,568
2 Claims. (Cl. 176—39)

In a number of rapidly advancing technologies a need has developed for supplying power pulses, i.e., rapid, brief increases in the power level delivered by a nuclear reactor. In space satellites power pulses are required for the transmission of information to ground receivers and for providing various controls regulating the orientation of the satellite or other space vehicles. Additionally, intermittent power pulses are needed in the operation of sonar transducers, high energy particle accelerators and fusion research machines.

In the past a number of nuclear reactors have been pulsed, however, all of these reactors have been handicapped by the time delay between the inception of the pulse and the development of the increase in power level. Such delays result from the time lag involved in the mechanical translation of thermal to electrical energy. In most presently known reactor systems the heat generated in the reactor is generally removed by a primary coolant, which in turn vaporizes a secondary coolant, and the secondary coolant then is utilized in a turbine for the generation of electrical power.

It is the primary object of the present invention to afford a method of operating a nuclear fueled reactor in which short-term substantially instantaneous increases in electrical power can be achieved.

Accordingly, the present invention is directed to the method of operating a nuclear reactor which incorporates the use of nuclear fueled thermionic conversion elements. By rapidly adding reactivity to a reactor core containing thermionic conversion elements, for a brief period the fission chain reaction runs uncontrolled whereby the power level in the core rises greatly above the power level at which it operates under normal control conditions.

Thermionic conversion is a method for the direct conversion of heat to electricity by electron emission. In a thermionic converter, heat supplied at a high temperature has a portion of the heat converted directly into electricity, with the residual heat available for conversion into useful work at the prevailing lower temperature. The thermionic converter relies for its operation on thermionic electron emission and, therefore, must of necessity be supplied from a very high temperature heat source because relatively high temperatures are required to give a reasonable amount of electron emission. For this reason nuclear fuel in a controlled fission chain reaction is particularly adaptable for use in thermionic conversion because of the high temperatures it is capable of delivering. Actually, the temperatures available from nuclear fuel are limited to a greater extent by the thermal and mechanical properties of the materials containing the fuel than by the fuel itself.

A thermionic converter is basically an electron tube, and its use inside a nuclear reactor requires that it be in conjunction with a reactor fuel element. In its simplest form one version of a thermionic converter consists of two electrodes of different material in a vacuum. One electrode, the cathode, is kept hot enough to emit electrons thermionically while the other electrode, the anode, is kept relatively cool. Electrons emitted from the cathode flow to the anode, then out through an electrical load and back to the cathode thereby completing the electrical circuit. It should be noted that in this process there are no moving parts.

It is possible to maintain very large temperature differences between the electrodes without excessive heat losses since nearly all of the heat transfer between electrodes is by radiation. However, when there is a high vacuum between the electrodes, considerable space charge builds up at large current densities so that the flow of electrons is restricted. This space charge is neutralized in the thermionic converter by the introduction of small amounts of an alkali metal vapor, such as cesium, which is easily ionized. These positive ions, supplied by the alkali metal, provide a neutral plasma between the cathode and anode through which the electron current can move freely. As a result of the neutralization of the space charge by the alkali metal vapor, the converter operation is relatively insensitive to electrode spacing so that practical manufacturing tolerances may be achieved.

When the alkali metal vapor is used to solve the space charge problem in the plasma chamber, the quantity of electrons passing from the cathode to the anode depends on their respective temperatures and work functions.

If the electrons were at the temperature of absolute zero, the kinetic energy of the free electrons would range from zero up to a certain maximum value called the Fermi level, the kinetic energy being distributed within a number of fixed energy levels.

The electrodes, since they are of different materials, have different Fermi levels, the cathode having a low Fermi level and the anode a high Fermi level. In this circumstance a free electron leaving the cathode body and coming to rest outside of the cathode surface will require a larger additional amount of energy than would a free electron leaving the surface of the anode. Thus the free electrons in the anode Fermi level have more energy than the free electrons in the cathode Fermi level. The energy that must be supplied to cause a free electron in the cathode Fermi level, to make it leave the cathode body and come to rest just outside the cathode surface, is called the work function of the cathode. The work function is that minimum amount of energy that is required to be given to an electron so that it is able to pass through a potential barrier. In a metal electrode, as discussed here, it is the energy gap between the crest of the potential barrier and the Fermi level of the electrode material.

Since the work function of the cathode will of necessity be larger than the work function of the anode, there is a net amount of cathode induced energy available for doing work, once the electrons of the cathode have entered the anode and joined the high energy-free electrons in the anode Fermi level. Thus, by connecting the cathode and anode with each other by means of a lead wire and a load, power is produced by thermionic conversion when the electrons flow from the cathode, through the interelectrode gap, to the anode, and back to the cathode through the lead wire and load.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
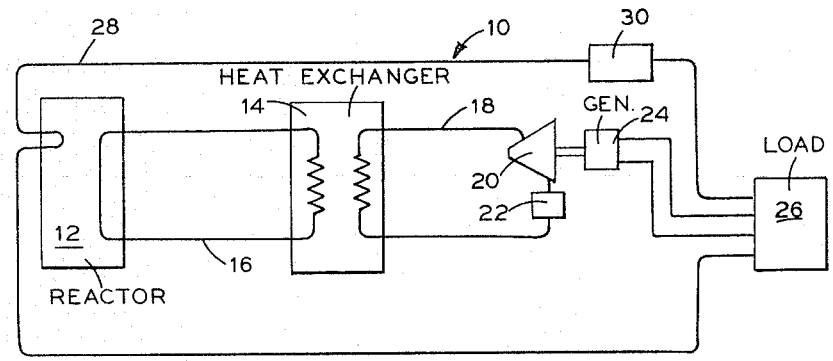
FIG. 1 is a schematic illustration of a nuclear reactor system embodying, in combination, thermionic and indirect heat energy conversion.

In FIG. 1 there is shown a typical reactor system 10 comprising a water-cooled and moderated reactor 12 containing a core (not shown) in which a controlled fission chain reaction can be maintained. Primary coolant water is circulated through the reactor 12 and heat exchanger 14 in a closed primary coolant loop 16. Within the heat exchanger 14 a secondary coolant water is vaporized in indirect heat transfer relationship with the primary coolant. From the heat exchanger 14 the vaporized secondary coolant flows in a closed secondary coolant loop 18 to a turbine 20 and then to a condenser 22 before returning to he heat exchanger. The turbine 20 in combination with a generator 24 connected to an electrical load 26 provides the final step in the indirect conversion to usable energy of a portion of the heat generated within the reactor core.

In addition to the indirect conversion of heat energy by means of the heat exchanger 14, the turbine 20 and generator 24, heat is directly converted to energy within the reactor by means of thermionic conversion. This energy, directly converted to electricity within the reactor, is supplied to the load 26 by means of a closed electrical circuit 28 and a converter 30 which provides the desired electrical characteristics.

The reactor 12 may be either of the pressurized-water or of the boiling-water type. Coolant passing through the reactor is heated and then flows through the primary coolant loop to the heat exchanger where it passes in heat exchange relationship with the secondary fluid. Steam produced in the secondary coolant loop flows to the turbine 20 which in combination with the generator 24 provides electrical energy to the load 26. At the same time a portion of the heat generated within the core is converted directly to electrical energy by means of thermionic conversion cells, and this energy is also delivered to the load 26 by means of electrical circuit 28.

Figure 2:
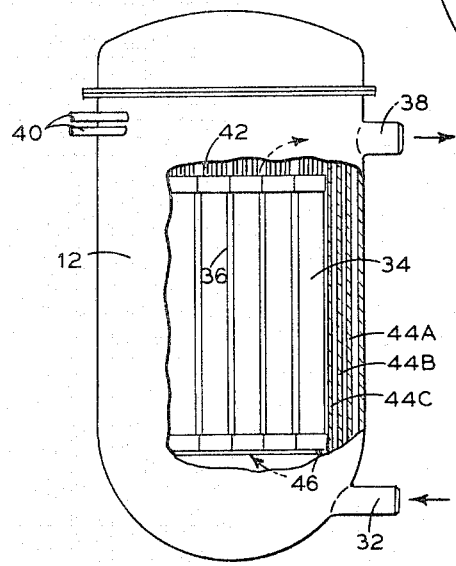
FIG. 2 is a side view partially in section of a nuclear reactor in which the method embodying the present invention may be employed.

In FIG. 2 a typical embodiment of the reactor 12 is shown. Coolant is supplied to the reactor from the primary coolant loop 16 in FIG. 1 through the inlet 32, flows upwardly through the core 34 formed by a number of thermionic conversion nuclear fuel cell assemblies 36, and then flows back into the primary coolant loop through outlet 38. The electrical energy developed within the thermionic conversion fuel cell assemblies 36 passes out from the reactor through connection 40 into the electrical circuit 28 of the reactor system 10 in FIG. 1.

Control of the reactor 12 may be achieved in a number of ways. As illustrated in FIG. 2, a plurality of tubes 42 extend upwardly from each of the assemblies 36. Ball control means as described in the copending application of John W. Ryon and Donald C. Schluderberg, Serial No. 29,281, filed February 28, 1961, by the common assignee, could be used in these tubes to control reactivity. Conventional control rods disposed within the core or a combination of control rods and spectral shift control could be employed also to control the fission chain reaction. Spectral shift control is described in Patent No. 3,081,246, issued March 12, 1963, to Milton C. Edlund.

Thermal shields 44A, 44B and 44C encircle the assemblies 36 within the reactor vessel. At its lower end the inner thermal shield 44C has a lip 46 which projects radially inward and provides support for the peripheral assemblies 36 at their lower ends.

Figure 3:
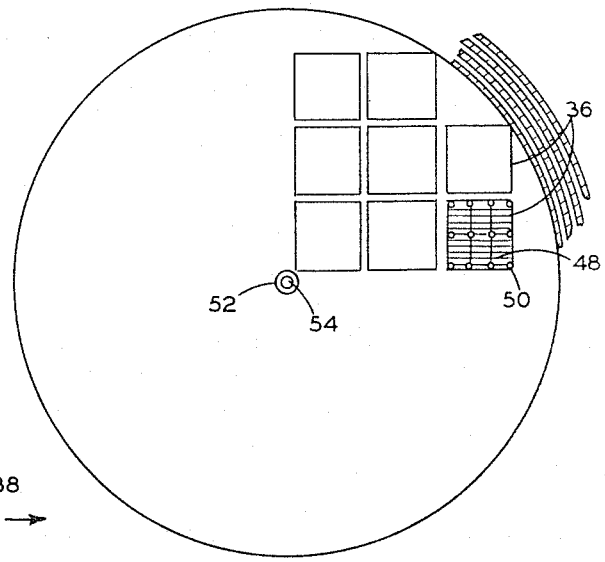
FIG. 3 is a horizontal section showing only a portion of the interior of the reactor shown in FIG. 2.

In FIG. 3 the thermionic fuel cell assemblies 36 are shown arranged in a square lattice within the reactor. Each of the elements 36 contains a number of thermionic cells 48 of the type as shown in the application Serial No. 125,701, filed July 21, 1962, by M. F. Sankovich et al. for a Thermionic Conversion Nuclear Reactor. Additionally, longitudinally extending passageways 50 are disposed in the walls of the fuel cell assemblies to receive ball means containing neutron absorbing material for controlling the reactor. At the center of the reactor core is a longitudinally extending tube 52 arranged to receive a pulse rod 54.

It would be possible to operate the reactor shown in FIGS. 2 and 3 either as a power reactor with the intermittent power pulses or simply as a pulsed reactor. The characteristics of the core and the power obtainable from it depend upon the manner in which the reactor is used, whether it is to be used for normal power operation and pulsing or merely for pulsing. If the reactor is to be used for pulsing alone, because of the relatively brief duration of the power peaks, it would be possible to employ a smaller core than that needed for constant power operation equal to the peak demand.

The method of operating the reactor shown in FIGS. 1, 2 and 3 is described in the above-mentioned patent application, Serial No. 125,701. When used as a pulsed reactor, in addition to the regular control system a pulse rod is also included in the core. Depending on the material make-up of the pulse rod, the pulse may be initiated by inserting the rod if it contains fuel or by removing the rod if it contains neutron absorbing material.

Figure 4:
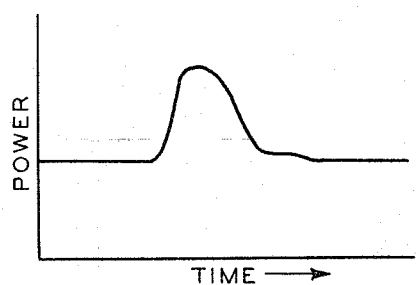
FIG. 4 is a graphical representation of the pulsed power level rise in a reactor similar to that shown in FIGS. 2 and 3 above.

For purposes of describing the operation of the reactor 12 it is assumed that the pulse rod 54 contains neutron absorbing material, and the pulse would be commenced by withdrawing the rod from the core. With the sudden withdrawal of the rod, there will be additional reactivity available in the core resulting in an instantaneously increased fission rate. As the fission rate increases, the fuel temperature within the thermionic elements will also increase and will be translated immediately into a rise in cathode temperature. Since the electrical power output of the thermionic converter elements is directly dependent on cathode temperature, with the rise in such temperature, there will be an almost simultaneous increase in the power output. In the reactor described in the above-mentioned patent application of Sankovich et al., the pulse could continue for a period of from milliseconds to a few seconds until shutdown by the increase in voids developed in the water-cooled reactor because of the heat generated within the core or until the pulse rod is rapidly reinserted into the core. In FIG. 4 the graph shows the general shape of this power pulse, rising sharply to its peak and then returning equally sharply to its original level. While employing the pulse rod for shutdown requires operator activation, pulse shutdown due to voids formation in the core is an inherent characteristic of the reactor itself. Since shutdown caused by voids formation is inherent, it does not permit the selection of a pulse time period which is possible using the pulse rod. Of course, the duration of the pulse using the rod for shutdown could not be longer than it would take the voids formation to effect shutdown. These are only two of the several ways in which the pulse may be terminated, other shutdown mechanisms will be described subsequently.

Figure 5:
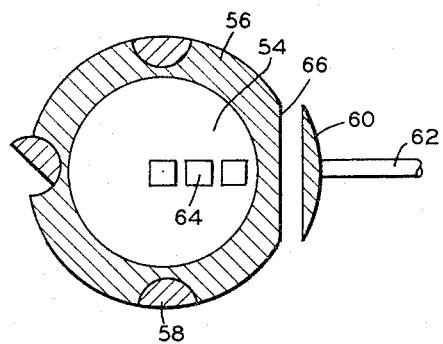
FIG. 5 is a simplified partial showing of a transverse section through the core of another reactor arranged to provide a pulsed power level.

In FIG. 5 there is shown a reactor core 54 surrounded by a reflector 56. Rotatable control drums 58 are disposed in spaced positions about the periphery of the reflector. A segment shaped transient section 60 is also disposed about the periphery of the reflector. Attached to the section 60 is an arm 62 for positioning it a specific distance from the reflector and thereby instituting and regulating the pulse. The core 54 is made up of a number of thermionic fuel elements 64 comprising individual nuclear fuel thermionic cells.

In operation reactor core 54, which is intended to provide both a normal power output and a higher pulsed power peak, is brought to its operating power level by properly positioning the control drums 58 in relation to the reactor core. When it is desired to pulse the reactor, the transient section 60 is driven from its original position spaced from the reflector into the mating portion 66 of the reflector. With the pulse initiated, the transient section is then moved away from the reflector toward its original position to a point at which a small amount of excess reactivity remains in the core. This movement levels off the power peak achieved by the pulse. Control of the pulse level and its termination is provided by the control drums. When it is desired to discontinue the pulse the control drums either return the core to its original lower operating power level or shut it down completely.

Figure 6:
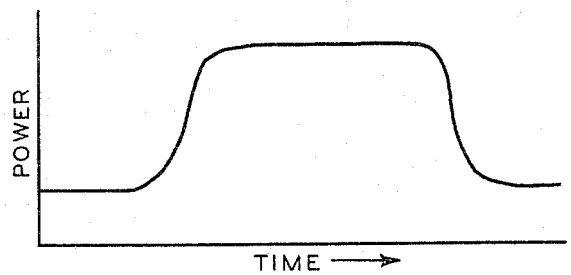
FIG. 6 is a graphical representation of a pulsed power output maintained at a specific level employing the reactor arrangement shown in FIG. 5.

By employing the combined core and pulse control system shown in FIG. 5, it is possible to achieve continuous reactor operation with brief instantaneous increases in the power level as required. The pulse may be regulated to achieve a peak of power, as is shown in the graph in FIG. 6, over a determined time period ranging from a few seconds to several minutes. Alternatively, the pulse power may be permitted to rise to its peak as is shown in the graph of FIG. 4 and then shutdown by manipulating the control drums so that a very brief pulsed power level in the millisecond-to-second range is attained.

As indicated earlier, it is the thermionic conversion element which permits the instantaneous rise in power level without any delay incurred in the transition from thermal to electrical power. The arrangement of the core will determine the type of pulse obtainable and the power level characteristics of the unit. The range of the power pulse may be many times that of the normal operating level of the core.

Two necessary features for pulsing a reactor core are (1) means for rapidly increasing core reactivity and (2) a method of limiting the power excursion and reducing the power level. In addition to adding fuel or removing neutron absorbing material for increasing core reactivity, it is possible to achieve the same result, and (3) by adjusting the reflector to reduce neutron leakage and (4) by altering the core geometry.

As indicated in its definition, a pulse must take place very quickly. It is, therefore, necessary that the means for instituting the pulse be operable to achieve very rapid additions of reactivity to the core. The quantity of reactivity added to the core to achieve a pulse will depend on the characteristics of the individual core as well as the type of pulse performance desired.

As a corollary to the rapid means needed to institute a pulse, it is also true that the pulse must be terminated rapidly. In addition to the foregoing means for terminating the pulse, it would also be possible to execute pulse shutdown by the inherent characteristic of moderator temperature rise when a solid moderator is employed. As temperature increases, the solid moderator expands, and its density is reduced causing pulse shutdown in a manner similar to that of voids formation. Still another way of terminating a pulse in smaller fast cores is to effect a sudden change in the geometry of the core. Another way of attaining shutdown is reliance on the Doppler effect in cases containing large amounts of uranium-238 or thorium-232. The Doppler effect will tend to limit the power excursion through increased resonance capture.

By combining the high temperatures available from a nuclear reactor core with the ability to immediately convert thermal energy to electrical energy, as characterized by thermionic elements, it is possible to achieve instantaneous rises or pulses in power level.

While in accordance with the provisions of the statutes there is illustrated and described herein the best forms and modes of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:
1. A nuclear reactor system comprising:
(A) a nuclear reactor,
(B) a core positioned within said reactor and containing sufficient nuclear fuel to sustain a fission chain reaction,
(C) control means for regulating the fission chain reaction,
(D) nuclear fueled thermionic elements arranged within said core for the direct conversion of heat generated in the fission reaction to electricity,
(E) means for the mechanical conversion of heat generated in the fission reaction into electricity,
(F) an electrical load connected to said thermionic elements and to said means for the mechanical conversion of heat to electricity, and
(G) means within said reactor in addition to said control means for rapid insertion of reactivity into said core whereby a sudden rise in temperature occurs in said core from the insertion of reactivity and results through said thermionic elements in a substantially instantaneous increase in electrical power.

2. A nuclear reactor system comprising:
(A) a nuclear reactor,
(B) a core positioned within said reactor and containing sufficient nuclear fuel to sustain a fission chain reaction,
(C) nuclear fueled thermionic elements arranged within said core for the direct conversion of heat generated in the fission reaction to electricity,
(D) means for controlling the fission reaction,
(E) a heat exchanger disposed remote from said reactor,
(F) a primary coolant circuit passing through said reactor and said heat exchanger,
(G) mechanical means for converting heat into electrical energy,
(H) a secondary coolant circuit passing through said heat exchanger and said means for converting heat to electrical energy,
(I) an electrical load connected to said means for the conversion of heat to electrical energy,
(J) a closed electrical circuit connected to said electrical load and passing through said reactor,
(K) said thermionic elements connected to said electrical circuit,
(L) means within said reactor in addition to said means for controlling fission reaction for rapid insertion of reactivity into said core whereby a sudden rise in temperature occurs in said core from the insertion of reactivity and results through said thermionic elements in a substantially instantaneous increase in electrical power, and
(M) means within said reactor for rapidly discontinuing the fission chain reaction.

References Cited by the Examiner

UNITED STATES PATENTS 3,093,567  6/1963  Jablonski et al. _____ 176—39 X
3,113,091  12/1963  Rasor et al. _____ 176—39 X

FOREIGN PATENTS 920,198  3/1963  Great Britain.
928,985  6/1963  Great Britain.

OTHER REFERENCES

Proceedings of the Second United Nations International Conference on the Peaceful Uses of Atomic Energy, vol. 10 (1958), pp. 461, 466, 472, 473, 474, 476–486.

REUBEN EPSTEIN, *Primary Examiner.*